United States Patent Office

3,527,847
Patented Sept. 8, 1970

3,527,847
THIONOPHOSPHORAMIDES AND PROCESS THEREFOR
Philip S. Magee, San Rafael, and Larry E. Stevick, San Francisco, Calif., assignors to Chevron Research Company, San Francisco, Calif., a corporation of Delaware
No Drawing. Continuation-in-part of application Ser. No. 340,501, Jan. 27, 1964. This application Aug. 2, 1967, Ser. No. 657,780
Int. Cl. C07f *9/24;* A01n *9/36*
U.S. Cl. 260—934                        10 Claims

ABSTRACT OF THE DISCLOSURE

Compounds of the formula

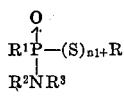

in which $R^1$ is an organic radical such as a hydrocarbyl radical bonded to the phosphorus by an O, S or C atom, R has 1 to 18 carbon atoms and is an aliphatic radical substituted with 0 to 6 halogen atoms, and 0 to 1 alkoxycarbonyl groups or monocyclic aryl substituted with halogens or nitro groups, $R^2$ and $R^3$ are individually hydrogen or organic radicals of 1 to 18 carbon atoms and $n$ is 1 or 2. These compounds are prepared by reacting a thionophosphoramidate with a thiosulfenyl halide or sulfenyl halide. Compounds of this group exhibit fungicidal and other biological activity.

CROSS REFERENCE TO RELATED APPLICATIONS

This application is a continuation-in-part of copending application Ser. No. 340,501, filed Jan. 27, 1964, now abandoned.

FIELD OF INVENTION

This invention concerns polythiophosphoramidothioate compounds and their preparation. More particularly, this invention concerns polythiophosphoramidothioate compounds, their preparation from sulfenyl halides and thionophosphoramidate compounds, and their use as pesticides.

DESCRIPTION OF INVENTION

Compounds of the following formula:

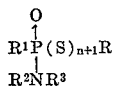

can be prepared by the reaction of sulfenyl halides of the formula:

$$R(S)_nX$$

and a thionophosphoramidate of the following formula:

according to the following equation:

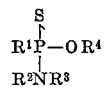

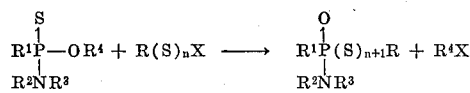

R can be any organic radical which can form a stable bond to sulfur and which does not have functional groups which will react with the thionophosphoramidate compound. The R in the sulfenyl halide or thiosulfenyl halide may be aliphatic such as alkyl and alkenyl, which have 0 to 6 halogen substituents and 0 to 1 alkoxy carbonyl substituents; cycloaliphatic; aryl or heterocyclic which contain 1 to about 3 N, O or S heteroatoms. R will generally contain 1 to 18 carbon atoms, more usually 1 to 12 carbon atoms. Preferred R groups are alkyl of 1 to 6 carbon atoms, polyhaloalkyl in which the alkyl group has 1 to 6 carbon atoms and is substituted with 3 to 6 halogens of atomic number 17 to 35, i.e., Cl and Br, and 0 to 1 alkoxycarbonyl groups in which the alkyl group has 1 to 6 carbon atoms and monocyclic aryl substituted with 0 to 5 halogens of atomic number 17 to 35 and 0 to 2 nitro groups.

The atom bonded to the sulfur of the sulfenyl and thiosulfenyl halides (X) will generally be chloro or bromo, i.e., halogen of atomic number 17 to 35.

$n$ is an integer varying from 1 to 2.

Among sulfenyl halides and thiosulfenyl halides which may be used are tert.-butylsulfenyl chloride, tert.-butylthiosulfenyl bromide, benzylsulfenyl chloride, phenylsulfenyl chloride, tolylsulfenyl chloride, 1-naphthylthiosulfenyl chloride, cyclohexylsulfenyl chloride, o-, m-, p-nitrophenylsulfenyl chloride, 2,4 - dinitrophenylsulfenyl chloride, 4-chloro-2-nitrophenylsulfenyl chloride, o-, m-, p-fluorophenylsulfenyl bromide, o- and p-chlorophenylsulfenyl chloride, acetylphenylsulfenyl chloride, 2,4-dichlorophenylsulfenyl chloride, pentachlorophenylsulfenyl chloride, 2-pyridylsulfenyl chloride, 2-thienylthiosulfenyl chloride, 3-methoxypropylsulfenyl chloride, o-, m-, p-bromophenylsulfenyl chloride, trichlorovinylsulfenyl chloride, 2,2-dichlorovinylsulfenyl bromide and 1,2-dichlorovinylsulfenyl chloride.

$R^1$ may be bonded to the phosphorus by carbon or by chalcogen of atomic number 8 to 16, i.e., O or S. $R^1$ is an organic radical which may be alkyl, aryl, heterocyclic, cycloaliphatic, etc. The heterocyclic groups will normally contain 1 to about 3 N, O or S heteroatoms. Nitrogen heterocycles are preferred. $R^1$ will usually contain not more than 18 carbon atoms, more usually 1 to 12 carbon atoms. Any substituents may be present on the radical which will not react with thet hiosulfenyl halide or the sulfenyl halide. These substituents include halogen, oxo-carbonyl groups, non-oxocarbonyl groups, nitro, cyano, etc. Preferably $R^1$ is a hydrocarbyl group bonded to phosphorus by O or S.

Illustrative of radicals within the scope of $R^1$ are methoxy, ethoxy, isopropoxy, butoxy, methoxymethyl, phenyl, o-, m-, p-chlorophenoxy, methyl mercapto, ethyl mercapto, hexyl mercapto, o-, m-, p-nitrophenoxy, o-, m-, p-chlorobenzyloxy, m-, p-cyanophenyl mercapto, 2-thienyloxy, pyridyloxy, methyl, β-methoxyethyl, etc. Preferred $R^1$ groups are lower alkoxy or lower alkyl mercapto, i.e., 1 to 6 carbons, free of aliphatic unsaturation.

$R^2$ and $R^3$, the radicals bonded to nitrogen, may be the same or different and can be hydrogen or an organic radical. Generally $R^2$ and $R^3$ will contain 1 to 12 carbon atoms, more usually 1 to 8 carbon atoms. $R^2$ and $R^3$ may be alkyl, carbacyl, hydrocarbyloxycarbonyl, aryl hydrocarbon of not more than 10 carbon atoms, and heterocycles containing one annular heteroatom of atomic number 7 to 8, i.e., oxygen and nitrogen atoms. Generally, $R^2$ and $R^3$ will be free of aliphatic unsaturation. Preferably $R^2$ and $R^3$ contain 1 to 10 carbons and 0 to 1 nitrogen atoms (nitrocyclic) or are hydrogen. More preferred, one of $R^2$ and $R^3$ is hydrogen.

Illsutrative of $R^2$ and $R^3$ are ethyl, iso-butyl, m-pentyl, 2-furyl, 2-(N-methyl)pyrryl, benzoyl, m-tolyl, p-cumyl, benzyl 2, 4-dimethylphenyl, hexanoyl, cyclohexyl carbonyl, isopropoxy carbonyl, methoxy carbonyl, N,N-dimethyl carbamoyl, etc.

$R^4$ can be alkyl, or aralkyl, generally of not more than 12 carbon atoms, preferably of not more than 6 and more preferably of not more than 3. Various $R^4$'s are methyl, ethyl, propyl, benzyl, β-phenethyl, dodecyl, etc. Since R⁴ does not appear in the final product, it is only necessary that it be capable of substitution by halogen, that is, that it be bonded to oxygen by a saturated aliphatic carbon atom.

The limitations to the various radicals, with the exception of R⁴, and the absence of groups—which are few—which interfere with the reaction, are generally ones of expedience. Polyfunctional groups having numerous and varied functionalities are rare and difficult to synthesize. Applicants' process provides a simple and convenient method for preparing a polythiophosphoroamidothioate from a sulfenyl halide and a thionophosphoramidate. The only portions of the molecules which are essential to the reaction are as follows:

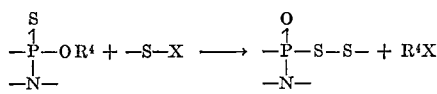

That is, R¹, R², R³ and R are relatively passive in their role in this process; these radicals provide the environment in which the reaction occurs, but are not active participants. Subject to the limitation that there be no interfering functionalities on these radicals, there is no reasonable basis for their limitation. The 12 carbon limitation is one of expedience and is not essential to the character of the invention.

The reaction is simply carried out by bringing the sulfenyl halide and the thionophosphoramidate together at ambient or elevated temperatures in the presence or absence of a solvent. With a few compounds, a small amount of a mild Friedel-Crafts catalyst may be required.

The solvents, if used, are inert hydrocarbons or halohydrocarbons, such as chloroform, benzene, hexanes, octanes, toluene, xylene, chlorobenzene, fluorobenzene, etc. Also, inert esters or ethers may be used. It is most convenient when using elevated temperatures to use a solvent which boils at the desired temperatures. The concentration of the reactants is not critical; the concentrations will generally vary in the range of 0.5 to 2 molar.

The temperature will generally be in the range of 0° to 125° C., depending on the particular compounds used. More usually, the temperature will be in the range of about 20° to 100° C.

The catalysts which find use are mild Friedel-Crafts catalysts, that is, salts of metals of atomic number of 29 or greater. Illustrative of such compounds are mercuric chloride, cupric chloride, antimony trichloride, zinc chloride, etc.

Compounds of this invention of particular interest because of their biological activities have the following formula:

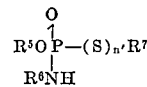

in which n' is 2 or 3, R⁵ is alkyl of 1 to 6 carbon atoms, R⁶ is a hydrocarbyl radical of 1 to 8 carbon atoms or alkoxycarbonyl in which the alkyl group has 1 to 6 carbon atoms and R⁷ is polyhaloalkyl in which the alkyl group has 1 to 6 carbon atoms and is substituted with 3 to 6 halogens of atomic number 17 to 35, at least one of said halogens being bonded to the α-carbon atom and 0 to 1 alkoxycarbonyl groups in which the alkyl group has 1 to 6 carbon atoms or a monocyclic aryl group substituted with 0 to 5 halogen atoms of atomic number 17 to 35 and 0 to 2 nitro groups. Preferred compounds of this group are those wherein n' is 2, R⁵ is methyl or ethyl, R⁶ is alkyl of 1 to 4 carbon atoms or phenyl and R⁷ is polychloroalkyl in which the alkyl group has 1 to 2 carbon atoms and is substituted with 3 to 5 chlorine atoms, at least one of which is bonded to the α-carbon atom or p-chlorophenyl.

Illustrative of R⁵ is methyl, ethyl, propyl, isopropyl, butyl and hexyl. Illustrative of R⁶ is methyl, ethyl, isopropyl, butyl, tert.-butyl, phenyl, benzyl, tolyl, ethylphenyl, β-phenethyl, hexyl, methoxy, carbonyl, isopropoxy carbonyl, etc. R⁶ as a hydrocarbon group may be alkyl, cycloalkyl or aryl, preferably free of aliphatic unsaturation.

Illustrative of R⁷ are trichloromethyl, bromodichloromethyl, 1,1,2,2-tetrachloroethyl, 1,2,2,2-tetrachloroethyl, pentachloroethyl, 1,1,2-trichloropropyl, 1,1,2,3-tetrachlorobutyl, ethoxycarbonyldichloromethyl, 2-methoxycarbonyl-1,1,2,2-tetrachloroethyl, 1,2-dibromo-3-chloropropyl, o-, m-, and p-chlorophenyl, p-bromophenyl, 2,4-dichlorophenyl, pentachlorophenyl, etc.

EXAMPLES

The following examples are illustrative of the preparation of the compounds of this invention:

EXAMPLE I

N-phenyl diethylphosphoramidothionate and ethoxycarbonyldichloromethylsulfenyl chloride were dissolved in benzene and heated at reflux for 4 hours. The solvent was then stripped off yielding N-phenyl-O-ethyl ethoxycarbonyldichloromethyldithiophosphoramidate. This product had the following analysis:

Calculated (percent): Cl, 17.55; S, 15.81; P, 7.66. Found (percent): Cl, 18.15; S, 16.00; P, 7.72.

EXAMPLE II

To ethoxycarbonyldichloromethylsulfenyl chloride was added dropwise N-methyldiethylphosphoroamidothionate which resulted in a vigorous reaction. Ethyl chloride evolved. At the end of the addition the flask was heated to remove any remaining ethyl chloride yielding N-methyl-O-ethyl ethoxycarbonyldichloromethyldithiophosphoramidate as an orange oil. It's analysis was:

Calculated (percent): Cl, 20.7; S, 18.7; P, 9.05. Found (percent): Cl, 21.0; S, 19.25; P, 9.15.

The following table illustrates a number of compounds prepared according to the procedures of Examples I or II.

TABLE I

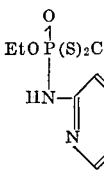

| Compound | Temp., °C. | Time, hrs. | Solvent | Cl Calc. | Cl Fd. | S Calc. | S Fd. | P Calc. | P Fd. | M.P., °C. |
|---|---|---|---|---|---|---|---|---|---|---|
| [MeO P(S)₃CCl₃ / NHCH₂—]₂ | 30 | 1 | HCCl₃ | 33.2 | 35.5 | 30.0 | 28.7 | 9.68 | 8.95 | 84–89 |
| EtO P(S)₂CCl₂CCl₂H / HN—(pyridyl) | 25 | 1 | Benzene | 34.1 | 34.7 | 15.4 | 15.4 | 7.45 | 7.70 | |

TABLE I—Continued

| Compound | Temp., °C. | Time, hrs. | Solvent | Cl Calc. | Cl Fd. | S Calc. | S Fd. | P Calc. | P Fd. | M.P., °C. |
|---|---|---|---|---|---|---|---|---|---|---|
| EtOP(S)$_3$CCl$_3$ / HNφ | Reflux | 4 | HCCl$_3$ | 26.7 | 26.7 | 24.1 | 24.2 | 7.78 | 7.61 | 128–131 |
| EtOP(S)$_2$CCl$_3$ / HNφ | Reflux | 2 | HCCl$_3$ | 29.0 | 28.7 | 17.48 | 17.55 | 8.46 | 8.76 | 101–3 |
| EtOP(S)$_2$CCl$_2$CCl$_2$H / HNφ | Reflux | 2 | HCCl$_3$ | 34.2 | 33.7 | 15.43 | 15.95 | 7.47 | 7.85 | 104–5 |
| MeOP(S)$_3$CCl$_2$CCl$_2$H / HNallyl | 25 | 2 | Hexanes | 35.7 | 35.75 | 24.2 | 24.5 | 7.8 | 7.53 | |
| MeOP(S)$_3$CCl$_3$ / HNallyl | 50 | 0.5 | Hexanes | 30.5 | 29.2 | 27.6 | 28.1 | 8.9 | 9.4 | |
| EtOP(S)$_3$CCl$_3$ / HNMe | Reflux | 1 | Benzene | 31.6 | 31.45 | 28.6 | 28.28 | 9.2 | 8.93 | |
| EtOP(S)$_2$CCl$_2$CCl$_3$ / HNtert.-butyl | Reflux | 4 | HCCl$_3$ | 41.3 | 41.3 | 14.9 | 14.95 | 7.23 | 6.70 | 76–77 |
| EtOP(S)$_2$CCl$_2$CCl$_2$H / HNtert.-butyl | 50 | 0.5 | HCCl$_3$ | 35.9 | 35.6 | 16.2 | 16.8 | 7.85 | 7.87 | |
| EtOP(S)$_3$CCl$_3$ / HNtert.-butyl | 50 | 1.5 | HCCl$_3$ | 28.0 | 28.0 | 25.4 | 25.7 | 8.18 | 7.88 | 64–66 |
| EtOP(S)$_2$Et / HNφ | Reflux | 1 | Carbon tetrachloride | | | 23.15 | 23.50 | 11.17 | 12.08 | |
| EtOP(S)$_3$CCl$_3$ / MeOC(O)—NH | Reflux | ½ | Benzene | 28.0 | 27.25 | 25.3 | 24.8 | 8.15 | 8.77 | |
| EtOP(S)$_2$CCl$_2$CCl$_2$H / MeOC(O)—NH | Reflux | ½ | Benzene | 35.7 | 35.10 | 16.15 | 16.95 | 7.8 | 7.65 | |
| EtOP(S)$_2$—C$_6$H$_4$—Cl / t.-Bu—NH | Reflux | ½ | Benzene | 10.48 | 10.42 | 18.88 | 18.85 | 9.13 | 9.10 | 59–61 |
| EtOP(S)$_2$—C$_6$H$_3$(NO$_2$)$_2$ / t.-Bu—NH | | 4 | None | 0.0 | 0.0 | 16.2 | 16.18 | 7.86 | 7.74 | [1] 228–236 |
| EtOP(S)$_2$CCl$_3$ / MeC(O)—NH | Reflux | 5 | HCCl$_3$ | 19.18 | 20.9 | 32.00 | 31.30 | | | |

TABLE I—Continued

| Compound | Temp., °C. | Time, hrs. | Solvent | Cl Calc. | Cl Fd. | S Calc. | S Fd. | P Calc. | P Fd. | M.P., °C. |
|---|---|---|---|---|---|---|---|---|---|---|
| EtOP(S)$_2$CCl$_2$CCl$_2$H with MeC(O)—NH | 0-25 | 2 | Ether/Et$_3$N | 34.30 | 33.75 | 23.30 | 22.55 | | | |
| EtOP(S)$_2$CCl$_3$ with MeC(O)—NH | 25 | 1 | Ether/Et$_3$N | 29.19 | 30.40 | 26.4 | 27.95 | | | |
| MeO—P(S)$_2$—C$_6$H$_4$—Cl, MeNH | 25 | | CH$_2$Cl$_2$ | 12.50 | 12.40 | 22.60 | 22.05 | 10.92 | 10.26 | |
| MeO—P(S)$_2$—C$_6$H$_4$—Cl, HN—i—propyl | | | | 11.4 | 11.56 | 20.6 | 20.6 | 9.99 | 10.05 | 54-56 |
| EtO—P(S)$_2$—C$_6$H$_3$(NO$_2$)$_2$, HN—i—propyl | | | | 0.0 | 0.0 | 16.2 | 16.18 | 7.86 | 7.74 | |
| MeO—P(S)$_2$—C$_6$H$_4$—Cl, HN—i—propyl | | | | 11.4 | 11.56 | 20.6 | 20.6 | 9.89 | 10.05 | 54-56 |
| MeO—P(S)$_2$—C$_6$H$_4$—Cl, HN—CH$_2$CH$_2$OCH$_3$ | | | | 10.85 | 11.22 | 19.59 | 19.85 | 9.5 | 9.7 | |
| MeO—P(S)$_2$—C$_6$H$_4$—Cl, NH$_2$ | | | | 13.15 | 13.15 | 23.8 | 23.10 | 11.5 | 11.72 | 72-73.5 |
| MeO—P(S)$_2$—C$_6$H$_4$—Cl, Et—NH | | | | 11.91 | 11.78 | 10.41 | 10.12 | 21.5 | 21.3 | |
| EtO—P(S)$_2$—C$_6$H$_4$—Cl, EtNH | | | | 11.4 | 11.95 | 20.6 | 20.3 | 9.98 | 9.4 | |
| EtO—P(S)$_2$—C$_6$H$_4$—Cl, MeNH | | | | 11.9 | 11.6 | 21.6 | 20.8 | 11.4 | 10.19 | |
| EtO—P(S)$_2$—C$_6$H$_5$, EtNH | | | | 0.0 | 0.0 | 23.1 | 21.7 | 11.15 | 12.85 | |
| MeO—P(S)$_2$—C$_6$H$_5$, EtNH | | | | 0.0 | 0.0 | 24.4 | 24.01 | 11.8 | 10.49 | |
| MeO—P(S)$_2$—C$_6$H$_4$—Cl, HN-propyl | | | | 11.4 | 11.45 | 20.6 | 20.0 | 10.0 | 9.62 | |
| EtO—P(S)$_2$—C$_6$Cl$_4$, Et—NH | | | | 39.5 | 39.7 | 14.2 | 14.42 | 6.90 | 7.28 | |

TABLE I—Continued

| Compound | Temp., °C. | Time, hrs. | Solvent | Cl Calc. | Cl Fd. | S Calc. | S Fd. | P Calc. | P Fd. | MP., °C. |
|---|---|---|---|---|---|---|---|---|---|---|
| MeO—P(O)—(S)$_2$—C$_6$H$_4$—NO$_2$ ; Me—NH | | | | 9.5 | 9.58 | 21.79 | 21.6 | 10.5 | 10.92 | |
| EtO—P(O)—(S)$_2$—C$_6$H$_4$—NO$_2$ ; Et—NH | | | | | | 19.9 | 19.58 | 9.61 | 9.58 | |
| MeO—P(O)—(S)$_2$—C$_6$H$_3$(NO$_2$)—Cl ; Me—NH | | | | 10.8 | 10.92 | 19.45 | 19.25 | 9.43 | 7.52 | |
| EtO—P(O)—(S)$_2$—C$_6$H$_4$—Cl ; Et—NH | | | | 11.4 | 15.59 | 20.5 | 20.52 | 9.94 | 7.67 | |

[1] Dec.

Compounds of this invention find use in controlling pests such as fungi, insects and acarids.

In order to demonstrate the pesticidal activity of the novel compounds of this invention, exemplary compounds were tested toward a variety of organisms under a variety of conditions.

The effectiveness against fungus spores was determined by means of "The Standard Spore Slide Germination Method for Determining Fungicidal Activity," described in the American Phytopathological Society Journal, 33 627–632 (1943). The method is designed to measure the fungitoxic activity of fungicidal chemicals, their activity being expressed in terms of percent inhibition of germination of fungus spores. Each compound to be tested was dissolved in acetone at a specified dilution, i.e., 10 p.p.m. These solutions were then pipetted into the wells of depression slides and allowed to dry. The wells were filled with a spore suspension of the test organism and incubated in a moist chamber overnight. A group of 100 spores was examined and the number of spores germinated and not germinated was counted and recorded to show the biological activity in terms of the percentage germination inhibition.

The following table shows the results obtained against the organisms *F. solani* and *M. fructicola*.

TABLE II

| Compound | Percent inhibition F. solani | Percent inhibition M. fructicola |
|---|---|---|
| EtOP(O)(S)$_3$CCl$_3$ ; MeNH | 100 | |
| EtOP(O)(S)$_2$CCl$_2$CCl$_2$H ; t.-Bu—NH | 100 | 100 |
| EtOP(O)(S)$_2$CCl$_3$ ; φNH | 100 | 100 |
| EtOP(O)(S)$_2$CCl$_2$CCl$_2$H ; φNH | 100 | 100 |
| EtOP(O)(S)$_2$CCl$_2$CO$_2$Et ; MeNH | 100 | |
| EtOP(O)(S)$_2$CCl$_2$CCl$_3$ ; t.-Bu—NH | | 100 |
| EtOP(O)(S)$_3$CCl$_3$ ; MeOC(O)-NH | 100 | |
| EtOP(O)(S)$_2$CCl$_2$CCl$_2$H ; MeOC(O)-NH | 100 | 100 |

Me—methyl. Et—ethyl. t.-Bu.—tert.-butyl. φ—phenyl.

A number of compounds were also tested by means of the mycelial drop test. This test is designed to measure the fungitoxic activity of fungicidal chemicals in terms of their degree of inhibition upon mycelial growth. Each fungitoxic compound to be tested was dissolved in acetone at a desired dilution, i.e., 500 p.p.m. Paper discs previously inoculated by impregnation with equal amounts of particular fungus mycelium and placed on potato dextrose agar medium were treated by applying a precise and equal volume of each of these fungicidal solutions to their center. Following treatment with the fungitoxic chemical, discs were incubated along with inoculated but untreated control discs at ambient temperatures until such time that these untreated control discs were filled with mycelial growth. Activity of the fungitoxic chemical tested was determined by comparative measurements of radii of mycelial growth away from the edge of the disc in treated and untreated samples. For this comparison a percent inhibition of growth area can be determined.

The results of this test for various fungitoxic chemicals on the particular fungus mycelium are indicated in the following table:

TABLE III

| Compound | Percent inhibition | | |
|---|---|---|---|
| | Pythium | Fusarium | Verticilium |
| $\text{EtO}\overset{\text{O}}{\underset{\text{MeNH}}{\text{P}}}(\text{S})_3\text{CCl}_3$ | 97 | | 94 |
| $\text{EtO}\overset{\text{O}}{\underset{\text{t.-Bu-NH}}{\text{P}}}(\text{S})_2\text{CCl}_2\text{CCl}_2\text{H}$ | 100 | 100 | 100 |
| $\text{EtO}\overset{\text{O}}{\underset{\phi\text{NH}}{\text{P}}}(\text{S})_2\text{CCl}_3$ | 100 | 90 | 78 |
| $\text{EtO}\overset{\text{O}}{\underset{\phi\text{NH}}{\text{P}}}(\text{S})_2\text{CCl}_2\text{CCl}_2\text{H}$ | 100 | 100 | 100 |
| $\text{EtO}\overset{\text{O}}{\underset{\text{MeOC-NH}}{\text{P}}}(\text{S})_2\text{CCl}_2\text{CCl}_2\text{H}$ | 97 | | 97 |

A number of compounds have also shown systemic acaricidal activity as evaluated by a soil drench test. The procedure is as follows: A 1 pint plastic container is filled ⅔ with sterilized University of California mix, watered heavily, sprinkled with a thin layer of dry sand over the wet soil and then 3 seeds are dropped on the sand and covered with ½ inch of Felton sand. The plants are keept in a greenhouse at 75° F. for at least about 10 days at which time they are ready to be used. An acetone solution of the toxicant is prepared at the desired concentration. The plants are then infested by placing leaves infested with two-spotted mites (*Tetrannyclus telarius* L.) on the plants treated with the toxicant solution. The mortality is rated after 48 hours infestation and recorded. The following table indicates the results using a concentration of 100 p.p.m. of the compound.

TABLE IV

| Compound | Percent mortality |
|---|---|
| $\text{EtO}\overset{\text{O}}{\underset{\text{MeNH}}{\text{P}}}(\text{S})_3\text{CCl}_3$ | 99 |
| $\text{EtO}\overset{\text{O}}{\underset{\text{MeNH}}{\text{P}}}(\text{S})_2\text{CCl}_2\text{CO}_2\text{Et}$ | 99 |

Compounds of the above formula in which $R^7$ represents p-chlorophenyl, particularly N-methyl-O-methyl-p-chlorophenyl-dithiophosphoramidate have exhibited activity against mites, houseflies and aphids.

Aside from the specific formulation and application of the class of compounds of the invention as represented by the above example, these compounds may be dispersed in or upon other inert liquid and solid carriers such as inert clay, xylenes, etc. The solid carriers may be in the form of a dust, or used in conjunction with a suitable wetting agent to form a wettable powder. The pesticidal compounds of the invention may also be formulated with other solvents, dispersing agents, or emulsifying agents. Further, these compounds may not only be applied alone or in mixtures with other compounds of the disclosed class, but may also be used in combination with other active toxicants in the formulation of pesticidal compositions.

The compounds may be applied to any environmental area which is a host to such pests or susceptible to attack by such pests. For example, the fungicidal compositions may be sprayed or otherwise applied directly to a vegetative host such as a plant, may be applied to the plant seed, sprayed upon the soil or other plant environment, or used in similar ways so as to effect the control of fungus and fungus-caused diseases.

We claim:

1. Compound of the Formula $$R^5O\overset{\text{O}}{\underset{R^6\text{NH}}{\text{P}}}-(\text{S})_{n'}R^7$$

in which $n'$ is 2 or 3, $R^5$ is alkyl of 1 to 6 carbon atoms, $R^6$ is hydrogen, a hydrocarbyl radical of 1 to 8 carbon atoms or alkoxycarbonyl in which the alkyl group has 1 to 6 carbon atoms and $R^7$ is polyhaloalkyl in which the alkyl group has 1 to 6 carbon atoms and is substituted with 3 to 6 halogen atoms of atomic number 17 to 35, at least one of said halogens being bonded to the alpha carbon atom, and 0 to 1 alkoxycarbonyl groups in which the alkyl group has 1 to 6 carbon atoms or a monocyclic aryl group having 0 to 5 halogen substituents of atomic number 17 to 35 and 0 to 2 nitro substituents.

2. The compound of claim 1 wherein $n'$ is 2, $R^5$ is methyl or ethyl, $R^6$ is alkyl of 1 to 4 carbon atoms or phenyl and $R^7$ is polychloroalkyl of 1 to 2 carbon atoms and 3 to 5 chlorine atoms, at least one of which is bonded to the α-carbon atom, or p-chlorophenyl.

3. The compound of claim 1 wherein $n'$ is 2, $R^5$ is methyl, $R^6$ is methyl and $R^7$ is p-chlorophenyl.

4. The compound of claim 1 wherein $n'$ is 2, $R^5$ is ethyl, $R^6$ is phenyl and $R^7$ is trichloromethyl or 1,1,2,2,-tetrachloroethyl.

5. The compound of claim 1 wherein $n'$ is 3, $R^5$ is ethyl, $R^6$ is methyl and $R^7$ is trichloromethyl.

6. The compound of claim 1 wherein $n'$ is 2, $R^5$ is ethyl, $R^6$ is methyl and $R^7$ is ethoxycarbonyldichloromethyl.

7. A method for preparing compounds of the Formula $$R^1\overset{\text{O}}{\underset{R^2NR^3}{\text{P}}}(\text{S})_{n+1}R$$

which comprises contacting at a temperature in the range of 0° and 125° C. a compound of the Formula $$R^1\overset{\text{S}}{\underset{R^2NR^3}{\text{P}}}OR^4$$

with a compound of the Formula $$R(S)_nX$$

wherein $n$ is an integer varying from 1 to 2;

X is halogen of atomic number 17 to 35;

R has 1 to 18 carbon atoms and is an aliphatic radical free of acetylenic unsaturation having as its only substituents from 0 to 6 halogens of atomic number 17 to 35 and 0 to 1 alkoxycarbonyl groups or a naphthyl or monocyclic aryl radical substituted with 0 to 5 halogens of atomic number 17 to 35 and 0 to 2 nitro groups;

$R^1$ has 1 to 18 carbon atoms and is a hydrocarbyl radical bonded to phosphorus by a carbon, oxygen or sulfur atom;

$R^2$ and $R^3$ are individually hydrogen or organic radicals of 1 to 12 carbon atoms selected from the group consisting of alkyl, carbacyl, alkenyl, aryl and hydrocarbyloxycarbonyl, and R⁴ is an organic radical of 1 to 12 carbon atoms bonded to the oxygen atom bonded to the phosphorus atom by a saturated aliphatic carbon atom.

8. The method of claim 7 wherein the reactants are contacted in the presence of an inert solvent at a temperature in the range of 20 to 100° C.

9. The method of claim 7 wherein R is alkyl of 1 to 6 carbon atoms, polyhaloalkyl in which the alkyl group has 1 to 6 carbon atoms and is substituted with 3 to 6 halogen atoms of atomic number 17 to 35 and 0 to 1 alkoxycarbonyl groups in which the alkyl group has 1 to 6 carbon atoms or monocyclic aryl substituted with 0 to 5 halogens of atomic number 17 to 35 or 0 to 2 nitro groups; R¹ is a hydrocarbyl radical of 1 to 12 carbon atoms bonded to phosphorus by a chalcogen atom of atomic number 8 to 16; R² and R³ are individually hydrogen or organic radicals of 1 to 10 carbon atoms selected from the group consisting of alkyl, carbacyl, alkenyl, aryl and hydrocarbyloxycarbonyl.

10. A method for preparing compounds of the Formula

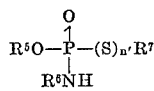

which comprises reacting a compound of the formula $$R^7(S)_{n-1}X$$

with a compound of the Formula

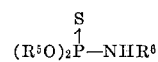

in which $n'$ is 2 or 3, X is halogen of atomic number 17 to 35, R⁵ is alkyl of 1 to 6 carbon atoms, R⁶ is hydrogen, a hydrocarbyl radical of 1 to 8 carbon atoms or alkoxycarbonyl in which the alkyl group has 1 to 6 carbon atoms and R⁷ is polyhaloalkyl in which the alkyl group has 1 to 6 carbon atoms and is substituted with 3 to 6 halogen atoms of atomic number 17 to 35, at least one of said halogens being bonded to the α-carbon atom, and 0 to 1 alkoxycarbonyl groups in which the alkyl group has 1 to 6 carbon atoms or a monocyclic aryl group having 0 to 5 halogen substituents of atomic number 17 to 35 and 0 to 2 nitro substituents.

No references cited.

CHARLES B. PARKER, Primary Examiner

A. H. SUTTO, Assistant Examiner

U.S. Cl. X.R.

260—294.8, 336.61, 332.5, 347.2, 985; 424—200, 202 203, 208